T. WANG.
DEVICE FOR HOLDING CHEESE AND OTHER FOODS.
APPLICATION FILED MAR. 25, 1916.
1,189,759. Patented July 4, 1916.
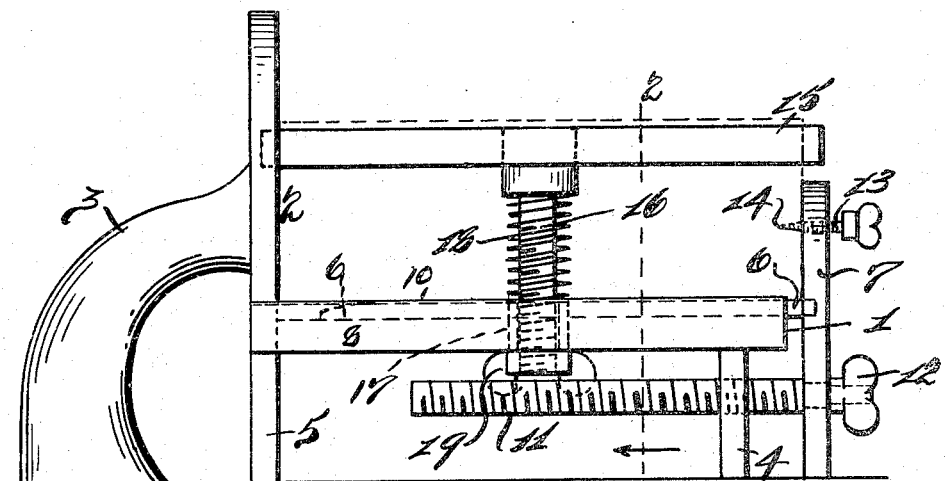
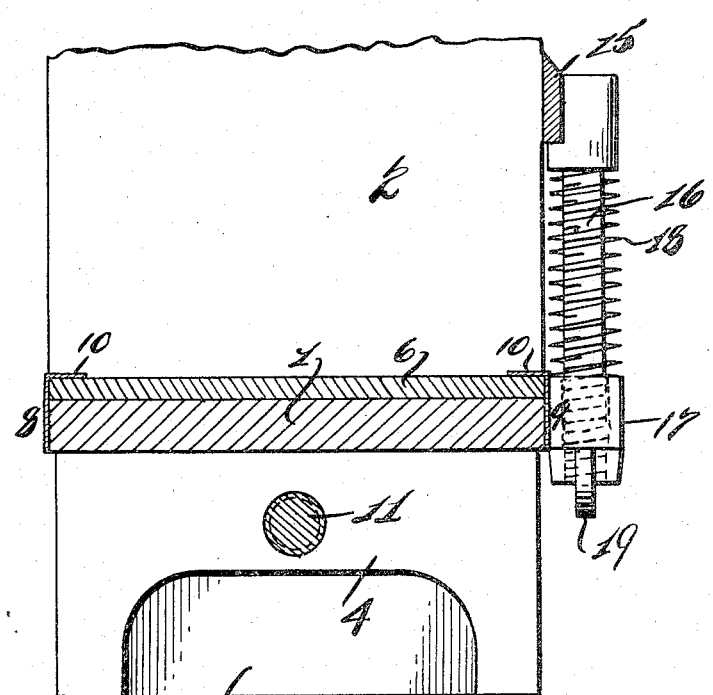

UNITED STATES PATENT OFFICE.

THORVALD WANG, OF BROOKLYN, NEW YORK.

DEVICE FOR HOLDING CHEESE AND OTHER FOODS.

1,189,759. Specification of Letters Patent. Patented July 4, 1916.

Application filed March 25, 1916. Serial No. 86,550.

*To all whom it may concern:*

Be it known that I, THORVALD WANG, a subject of the King of Norway, residing at Brooklyn, Kings county, State of New York, have invented certain new and useful Improvements in Devices for Holding Cheese and other Foods, of which the following is a full, clear, and exact description.

This invention relates to improvements in holding devices for cheese and other foods to be sliced.

One of the objects of my invention is to provide a device arranged to hold or grip cheese, bacon, or other foods in order that they can be sliced without holding the food in the hands while slicing.

I also provide means to guide the cutting implement in order that the slices can be made of equal thickness.

I will now proceed to describe my invention in detail, the essential features of which will be summarized in the appended claims, reference being had to the accompanying drawing, forming part hereof, wherein:

Figure 1 is a side elevation of my improved holder, and Fig. 2 is an enlarged cross sectional view thereof, the section being taken on line 2—2 in Fig. 1.

As herein illustrated my improved device consists of a table 1 provided with a fixed end member 2, to which is secured a handle 3. Adjacent the opposite end of the table 1, I secure a support 4 which coöperates with the extension 5 of the end member 2 to support the table 1. The table 1 slidably supports an extensible leaf 6, having secured at its free end an end member 7, which in combination with the end member 2 acts as a clamp. The table 1 carries plates 8 and 9 having inturned flanges 10 to act as guides for the slidable leaf 6. To operate or adjust the leaf 6 and its clamping or end member 7, I provide a threaded rotatable spindle 11 having a handle 12. The spindle 11 is rotatably supported by the end member 7 of the leaf 6 and is engaged by a threaded opening in the support 4.

To prevent any side movement on the part of the food to be sliced (indicated by dotted lines in Fig. 1) I provide an adjustable threaded pin 13 having a sharp point 14 to penetrate the food to be sliced.

To enable one to produce slices of equal thickness, I provide a guide rail 15 carried by a threaded post 16, slidably mounted in a block 17 carried by the table 1. A spring 18 acts to keep the guide rail up while a wing-nut 19 acts to adjust the said guide vertically.

After the food has been positioned, as indicated by dotted lines Fig. 1, the spindle 11 will be rotated to cause the end or clamp member 7 to engage the said article of food, after which the adjustable screw 13 will be manipulated to cause its point to penetrate the said article. The rail 15 will now be adjusted to permit of the slicing of the article by a knife or other suitable cutting implement which will be drawn along the upper edge of the guide 15 longitudinally of the holder, thus producing a slice. For subsequent slices the guide 15 will be lowered for each subsequent slicing by manipulating the wing nut 19.

It will be seen that the handle 3 rests upon the table as well as the supports 4 and 5. The handle therefore acts as an auxiliary support and will prevent the holder from tipping up while slicing, as the knife or other implement will be drawn from right to left.

Having now described my invention, what I claim and desire to secure by Letters Patent is:

1. A holder for articles of food to be sliced, consisting of a table portion, supports therefor, an extensible leaf carried by said table, clamp elements carried by said table and leaf, means to adjust the said extensible leaf, a guide rail extending longitudinally of said table to guide a cutting implement, and means to vertically adjust said rail.

2. A holder for articles of food to be sliced, consisting of a table portion, supports therefor, an extensible leaf carried by said table, clamp elements carried by said table and leaf, means to adjust the said extensible leaf, and a handle secured to said table, the free end of said handle being located in line with the bottom edges of the supports for said table, whereby said handle acts as an auxiliary support for said table.

3. A holder for articles of food to be sliced, consisting of a table, an end member carried thereby extending above and below said table, the lower portion of said end member acting as a support for said table, the upper portion of said end member acting as a clamp member, a leaf slidably secured to said table, an end member secured thereto and extending above and below said leaf, the lower portion of said end member acting as a support for said leaf, the upper portion acting as a clamp member, a second support for said table adjacent the free end thereof, and a rotatable threaded spindle carried by the end member of said leaf, said last named table support being provided with a threaded opening engaging said threaded spindle.

4. In combination with a holder for articles to be sliced, a guide for a cutting implement consisting of a rail extending longitudinally of the holder, a threaded spindle carried thereby, a support to slidably retain said spindle, a spring to force said rail in one direction, and a wing-nut in engagement with the threads of said spindle to move the rail in the opposite direction.

Signed at New York city, N. Y., this 22 day of March, 1916.

THORVALD WANG.

Witnesses:
MAURICE BLOCK,
EDWARD A. JARVIS.

Copies of this patent may be obtained for five cents each, by addressing the "Commissioner of Patents, Washington, D. C."